(12) United States Patent
Kashihara

(10) Patent No.: US 12,009,741 B2
(45) Date of Patent: Jun. 11, 2024

(54) POWER SUPPLY APPARATUS AND CONTROL METHOD OF POWER SUPPLY APPARATUS

(71) Applicant: NISSIN ELECTRIC CO., LTD., Kyoto (JP)

(72) Inventor: Hironori Kashihara, Kyoto (JP)

(73) Assignee: NISSIN ELECTRIC CO., LTD., Kyoto (JP)

( * ) Notice: Subject to any disclaimer, the term of this patent is extended or adjusted under 35 U.S.C. 154(b) by 169 days.

(21) Appl. No.: 17/610,437

(22) PCT Filed: Aug. 22, 2019

(86) PCT No.: PCT/JP2019/032727
§ 371 (c)(1),
(2) Date: Nov. 10, 2021

(87) PCT Pub. No.: WO2021/033299
PCT Pub. Date: Feb. 25, 2021

(65) Prior Publication Data
US 2022/0224220 A1 Jul. 14, 2022

(51) Int. Cl.
*H02M 1/32* (2007.01)
*H02J 7/00* (2006.01)
(Continued)

(52) U.S. Cl.
CPC ........... *H02M 1/325* (2021.05); *H02J 7/0063* (2013.01); *H02M 1/0009* (2021.05);
(Continued)

(58) Field of Classification Search
CPC ............ H02M 1/0003; H02M 1/0009; H02M 1/0025; H02M 1/32; H02M 1/325;
(Continued)

(56) References Cited

U.S. PATENT DOCUMENTS 10,084,317 B2  9/2018 Deboy et al.
11,211,880 B2 * 12/2021 Tajima .................... H02M 1/32
(Continued)

FOREIGN PATENT DOCUMENTS

CN  104081647  10/2014
CN  105227043  1/2016
(Continued)

OTHER PUBLICATIONS

"Office Action of Australia Counterpart Application", issued on Aug. 29, 2022, p. 1-p. 4.
(Continued)

*Primary Examiner* — Thienvu V Tran
*Assistant Examiner* — Shahzeb K Ahmad
(74) *Attorney, Agent, or Firm* — JCIPRNET

(57) ABSTRACT

A power supply apparatus (1) is provided with an energy storage device (10), a converter (20) for converting DC output to AC output, and a control unit (60). The control unit (60) controls the converter (20) such that, when an output current value exceeds a first limit value, the output current value becomes a predetermined value larger than the first limit value by lowering an output voltage value to less than a normal state value.

6 Claims, 3 Drawing Sheets

(51) Int. Cl.
 H02M 1/00 (2006.01)
 H02M 7/538 (2007.01)
 H02M 7/5387 (2007.01)

(52) U.S. Cl.
 CPC ..... *H02M 7/53871* (2013.01); *H02J 2207/20* (2020.01); *H02M 1/0025* (2021.05)

(58) Field of Classification Search
 CPC ............ H02M 1/36; H02M 7/42; H02M 7/48; H02M 7/4803; H02M 7/538; H02M 7/5387; H02M 7/53871; H02J 7/0063; H02J 2207/20
 See application file for complete search history.

(56) References Cited

U.S. PATENT DOCUMENTS

| | | | |
|---|---|---|---|
| 2015/0280564 A1* | 10/2015 | Siehl | G05F 1/56 323/271 |
| 2015/0364985 A1* | 12/2015 | Lee | H02M 5/458 363/37 |
| 2017/0317500 A1 | 11/2017 | Kumar et al. | |
| 2018/0342963 A1* | 11/2018 | Morschel | H02M 1/36 |

FOREIGN PATENT DOCUMENTS

| | | |
|---|---|---|
| CN | 105372533 | 3/2016 |
| CN | 105743122 | 7/2016 |
| CN | 110121825 | 8/2019 |
| JP | 08331862 A * | 12/1996 |
| JP | H08331862 | 12/1996 |
| JP | 5008465 | 8/2012 |
| JP | 2016005433 | 1/2016 |
| JP | 2016032325 | 3/2016 |
| JP | 6058147 | 1/2017 |
| TW | 201338390 | 9/2013 |
| TW | 201921825 | 6/2019 |
| WO | 2017158916 | 9/2017 |

OTHER PUBLICATIONS

Office Action of Australian Counterpart Application, issued on Dec. 19, 2022, pp. 1-4.
"Search Report of Europe Counterpart Application", issued on Mar. 27, 2023, p. 1-p. 10.
Office Action of Taiwan Counterpart Application, with English translation thereof, issued on May 11, 2020, pp. 1-11.
"Office Action of India Counterpart Application", with English translation thereof, issued on May 27, 2022, p. 1-p. 5.
"International Search Report (Form PCT/ISA/210) of PCT/JP2019/032727", mailed on Nov. 19, 2019, with English translation thereof, pp. 1-2.
"Office Action of China Counterpart Application", issued on Aug. 16, 2023, with English translation thereof, p. 1-p. 19.
"Office Action of China Counterpart Application", issued on Feb. 19, 2024, with English translation thereof, pp. 1-15.
"Office Action of Europe Counterpart Application", issued on Dec. 5, 2023, p. 1-p. 6.

* cited by examiner

POWER SUPPLY APPARATUS AND CONTROL METHOD OF POWER SUPPLY APPARATUS

CROSS-REFERENCE TO RELATED APPLICATION

This application is a 371 application of the International PCT application serial no. PCT/JP2019/032727, filed on Aug. 22, 2019. The entirety of the above-mentioned patent application is hereby incorporated by reference herein and made a part of this specification.

FIELD OF THE INVENTION

The invention relates to a power supply apparatus and a control method of a power supply apparatus.

DESCRIPTION OF RELATED ART

A power supply apparatus including an energy storage device, such as a secondary battery, to back up or to smooth power supply to a power system, etc., by using a power generation system is known. Such power supply apparatus includes a converter converting the DC power output by the energy storage device into AC power at a desired voltage and frequency. When the power supply from the power generation system drops or stops, such power supply apparatus operates so as to supply necessary AC power to the power system or specific power usage equipment.

PRIOR ART DOCUMENT

Patent Document

Patent Document 1: Japanese Patent "Patent No. 6058147".

SUMMARY OF THE INVENTION

Problems to be Solved by the Invention

For an isolated power system in a remote island or in the mountains, the application of a power supply apparatus including an energy storage device with a large capacity and the stabilization of power supply are desired. In such power system, such power supply apparatus is used to smooth the output of a power generation system using natural energy and as the backup of a power generation system requiring fuel, such as a diesel power generator. In such application, specifically when the power supply apparatus including an energy storage device supplies power to the power system, even when a short circuit failure, etc., occurs in the power system, it is considered that the operation of the power supply apparatus does not stop and supplying power as much as possible is necessary.

An aspect of the invention is made in view of the above issue, and the objective thereof is to realize a power supply apparatus including an energy storage device and capable of keeping supplying power as much as possible even in a case where a short circuit failure, etc., occurs in the power system.

Means for Solving Problems

To solve the above issue, a power supply apparatus according to an aspect of the invention includes: an energy storage device; and a converter for converting a DC output of the energy storage device into an AC output; a current measurer, measuring a current of the AC output; a voltage measurer, measuring a voltage of the AC output; and a control unit, controlling the converter. The power supply apparatus includes a configuration in which the control unit performs control on the converter, such that, at a time when a value of the current exceeds a first limit value, the value of the current becomes a predetermined value greater than the first limit value by lowering the voltage to be less than a normal value.

To solve the above issue, a power supply apparatus according to another aspect of the invention includes: an energy storage device; and a converter for converting a DC output of the energy storage device into an AC output; a current measurer, measuring a current of the AC output; a voltage measurer, measuring a voltage of the AC output; and a control unit, controlling the converter. The power supply apparatus includes a configuration in which: the control unit is provided with a current upper limit setting unit, a target voltage setting unit, and an output instruction unit. The current upper limit setting unit operates, so as to: at a time when a value of the current exceeds a first limit value, change a current upper limit value from the first limit value to a second limit value greater than the first limit value, and at a time when the value of the current drops below the first limit value, change the current upper limit value from the second limit value to the first limit value. The output instruction unit controls the converter, so that the voltage becomes a target voltage calculated by the target voltage setting unit. The target voltage setting unit, in a case where the value of the current exceeds the first limit value, lowers the target voltage to be less than a normal value, so that the value of the current becomes the current upper limit value.

To solve the above issue, a control method of a power supply apparatus according to an aspect of the invention is a control method of a power supply apparatus including an energy storage device and a converter for converting a DC output of the energy storage device into an AC output. The control method includes a configuration for performing control on the converter, such that, at a time when a value of a current of the AC output exceeds a first limit value, the value of the current becomes a predetermined value greater than the first limit value by lowering a voltage of the AC output to be less than a normal value.

Inventive Effects

According to the power supply apparatus according to an aspect of the invention, a power supply apparatus including an energy storage device and capable of keeping supplying power as much as possible even in a case where a short circuit failure, etc., occurs in the power system can be provided.

According to the control method of the power supply apparatus according to an aspect of the invention, a power supply apparatus including an energy storage device and capable of keeping supplying power as much as possible even in a case where a short circuit failure, etc., occurs in the power system can be realized.

DESCRIPTION OF THE EMBODIMENTS

Embodiment

In the following, an embodiment of the invention will be described in detail.

<Configuration of Power System to which Power Supply Apparatus is Applied>

Figure 1:
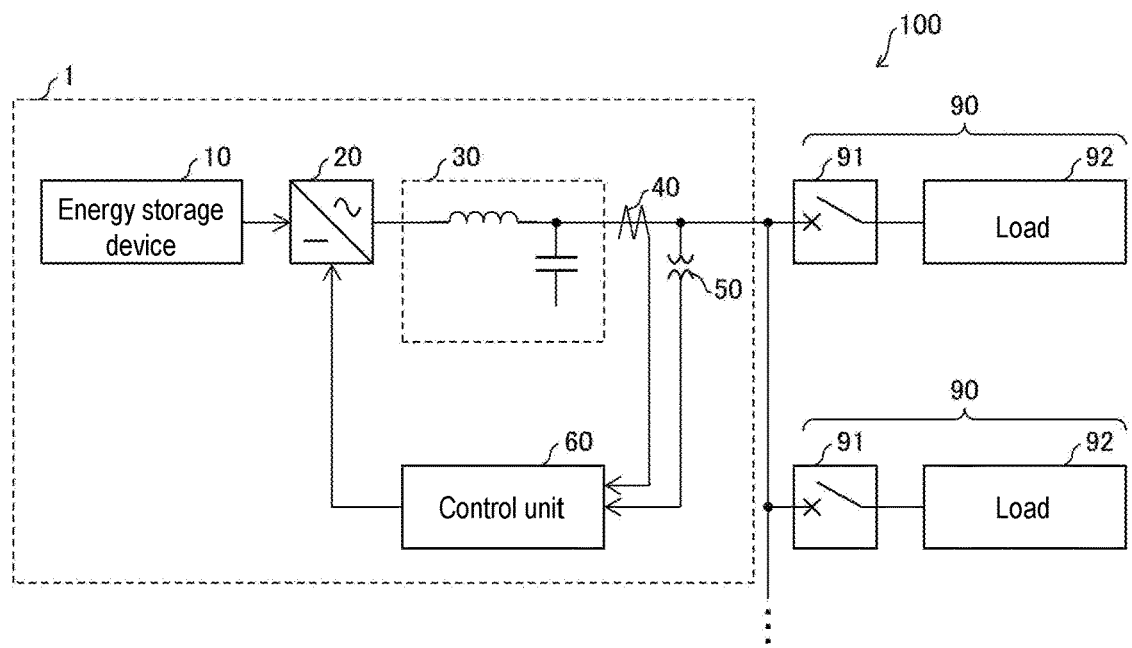
FIG. 1 is a schematic diagram illustrating a configuration of a power supply apparatus and a power system to which the power supply apparatus is applied according to an embodiment of the invention.

FIG. 1 is a diagram illustrating a power supply apparatus 1 according to an embodiment. In FIG. 1, the entirety of a power system 100 to which the power supply apparatus 1 is applied is shown. The power supply apparatus 1 is an apparatus including an energy storage device 10 and capable of storing power. The alternated current power (AC output) output by the power supply apparatus 1 is supplied to multiple feeders 90.

Each of the feeders 90 is formed by a breaker 91 and a load 92. In each of the feeders 90, when a short circuit failure occurs in the feeder 90, the breaker 91 detects the continuation of an overcurrent for a predetermined time and trips to disconnect the feeder 90 from the power system 100.

While not shown in FIG. 1, in the power system 100, a power generation system using natural energy, such as a solar power generation system or a wind power generation system, may also be arranged in parallel with the power supply apparatus 1. Alternatively, a power generation system using fuel, such as a diesel power generator or a cogeneration system, may also be arranged in parallel with the power supply apparatus 1. The power supply apparatus 1 may at least be applied as the backup of the output of an arbitrary one of the power generation systems. In this sense, the power supply apparatus 1 is also an uninterruptible power supply (UPS).

An isolated power system in a remote island or mountains can serve as a specific example of the power system 100. If a power generation system using natural energy is used in such power system, by applying the power supply apparatus 1 including the energy storage device 10, the power supply using natural energy is smoothed. Alternatively, if a power generation system using fuel is used in such power system 100, the power supply apparatus 1 may be adopted as a backup power supply in case of a failure of the power generation system.

However, the specific example of the power system 100 is not limited to an isolated power system in a remote island or mountains, and may also be a power system in a factory using a power generation system using natural energy or other power generation systems. Even in a power system in a factory, the effects and functions of the example disclosed in the invention are exhibited in a similar manner.

At the time of performing power supply to the power system 100, the power supply apparatus 1 according to the embodiment does not stop operation as much as possible even when a short circuit failure occurs in the feeders 90, and still operates to keep supplying power to the power system 100. In the following descriptions, for the ease of understanding, it is described that only the power supply apparatus 1 supplies power to the power system 100. However, if the power supply apparatus 1 supplies power to the power system 100, the operation of the power supply apparatus 1 remains the same even if the power supply apparatus 1 is arranged in parallel with another power generation system.

<Configuration of Power Supply Apparatus>

As shown in FIG. 1, the power supply apparatus 1 includes the energy storage device 10, a DC-AC converter 20 (converter), a filter 30, a current measurer 40, a voltage measurer 50, and a control unit 60.

The energy storage device 10 is a device storing input power therein as energy, and outputting the stored energy as direct current power (DC output) in accordance with needs. The energy storage device 10 may be a device including a secondary battery, such as a lithium-ion battery, a sodium-sulfur (NaS) battery, a redox flow battery, a lead-acid battery.

However, the energy storage device 10 is not limited to a device including a secondary battery. As the energy storage device 10, any arbitrary unit having a function of storing electric energy, such as a capacitor, a superconducting power storage unit, a flywheel power storage unit, a compressed air type power storage unit, can be used. Also, the energy storage device 10 being a device outputting DC power is a concept which also includes the case where the power temporarily output internally as AC power is converted into DC by a rectifying circuit or a converter, etc., and output.

The DC-AC converter 20 is a device converting DC power (DC output) output by the energy storage device 10 into AC power (AC output). The DC-AC converter 20 converts DC power into AC power with a desired voltage, frequency used by the power system 100 via the filter 30 by using pulse width modulation (PWM) in accordance with an output command from the control unit 60. The filter 30 is a filter for removing harmnoics included in the output of the DC-AC converter 20. The current measurer 40 and the voltage measurer 50 respectively measure the current and the voltage of the AC power (AC output) output by the power supply apparatus 1 and transmit such information to the control unit 60.

<Configuration of Control Unit>

Figure 2:
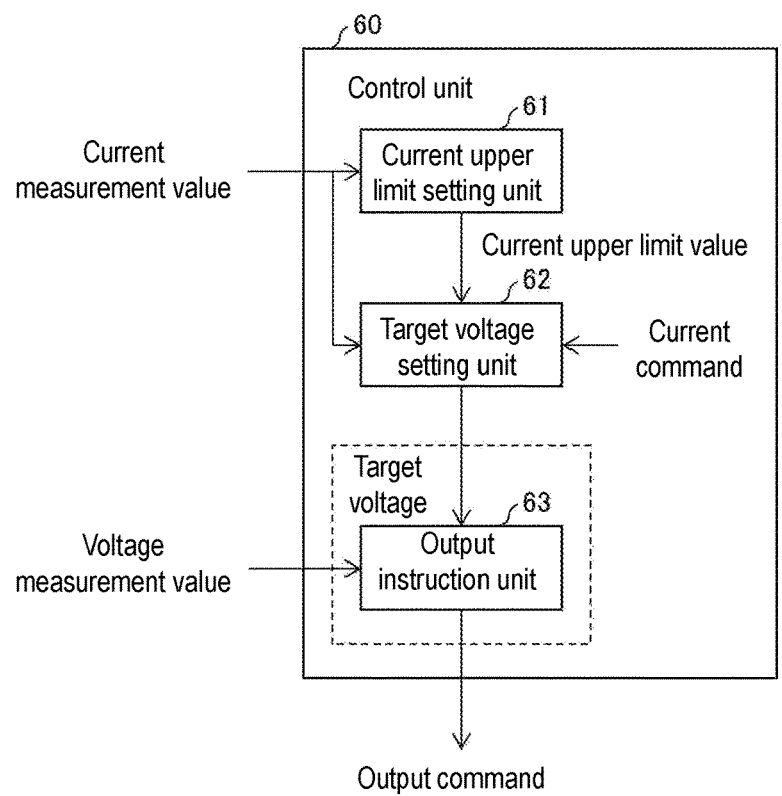
FIG. 2 is a block diagram schematically illustrating a configuration of a control unit of the power supply apparatus according to an embodiment of the invention.

FIG. 2 is a block diagram schematically illustrating a configuration of the control unit 60 of the power supply apparatus 1 according to the embodiment. As shown in FIG. 2, the control unit 60 is provided with respective functional blocks, which are a current upper limit setting unit 61, a target voltage setting unit 62, and an output instruction unit 63.

Firstly, referring to FIG. 2, the operation executed by the power supply apparatus 1 under the control of the control unit 60 is briefly described. The output instruction unit 63 which is a region shown as encircled by a broken line in FIG. 2 is a functional block which a control unit controlling the output of the DC-AC converter 20 usually includes. That is, the output instruction unit 63 usually refers to the voltage measurement value detected by the voltage measurer 50, and performs feedback control of the DC-AC converter 20 to output a target voltage which is normally a rated voltage with reference to the voltage measurement value detected by the voltage measurer 50.

However, in the control unit 60 of the embodiment, while the target voltage input to the output instruction unit 63 is usually a voltage command (normal value) that is normally the rated voltage, the target voltage is changed as follows in a case such as when a short circuit failure occurs in the feeder 90.

The current upper limit setting unit 61 operates as follows based on the current measurement value detected by the current measurer 40. At a usual time when the current measurement value is smaller than a first limit value, the current upper limit setting unit 61 calculates the first limit value as a current upper limit value. Here, the first limit value is set at a current value at which the DC-AC converter 20 is not damaged even if such current keeps being output.

When a short circuit failure occurs in any of the feeders 90, since an failure current flows, the current output by the DC-AC converter 20 increases drastically. Thus, the current measurement value exceeds the first limit value. In the case where the current measurement value exceeds the first limit value, the current upper limit setting unit 61 increases the calculated current upper limit value to a second limit value.

The second limit value is a value greater than the first limit value, and is selected from values equal to or less than a short-time overload level of the DC-AC converter 20. The second limit value is set according to a current value so that the breaker 91 trips with an overcurrent continuing for a predetermined time in the breaker 91 of the feeder 90 in which a short circuit failure occurs. As a specific value of the second limit value, a value that is 1.5 times to 2 times the first limit value is appropriate.

It is preferable that the current upper limit setting unit 61 changes the current upper limit value from the first limit value to the second limit value so that the value gradually changes. This is because the control of the output voltage of the power supply apparatus 1 changing with the current upper limit value can be stably executed.

In the case where the current measurement value exceeds the first limit value, the target voltage setting unit 62 calculates a voltage value dropping from the voltage command (normally the rated voltage) as the target voltage. By doing so, a feedback is made to the output command calculated by the output instruction unit 63, so that the current measurement value becomes the current upper limit value (a predetermined value also greater than the first limit value).

As a result, when the short circuit failure continues, the output voltage (voltage measurement value) of the power supply apparatus 1 becomes a voltage value dropping from the voltage command, and a balance is reached when the output current (current measurement value) becomes the second limit value which is the current upper limit value. By doing so, these values are controlled to be substantially constant, and the AC power (AC output) is output from the power supply apparatus 1.

Thus, the breaker 91 of the feeder 90 in which the short circuit failure occurs trips, and the filter 90 is disconnected. This is because the second limit value is set to a value that tripping occurs with an overcurrent (failure current) continuing for a predetermined time in the breaker 91 of the feeder 90 in which the short circuit failure occurs.

When the place where the short circuit failure occurs is disconnected from the power system 100, the failure current no longer occurs, the current output by the DC-AC converter 200 drastically decreases and returns to a value smaller than the first limit value. When the current measurement value drops below the first limit value, the current upper limit setting unit 61 calculates the first limit value as the voltage upper limit value. That is, the setting of the voltage upper limit value returns to normal.

Since the current measurement value does not exceed the current upper limit value, the target voltage setting unit 62 calculates the voltage command (normally the rated voltage) as the target voltage. The output instruction unit 63 feedback-controls the DC-AC converter 20, so as to output a voltage which is the voltage command.

At the time of restoring the output voltage of the power supply apparatus 1 to the normal value, it is preferable to exert control so that the output voltage changes gradually. This is because that, when the output voltage increases drastically, there is a concern that a transient overcurrent (excitation inrush current) occurs in a transformer in the power system 100, and the DC-AC converter 20, etc., is damaged.

Embodiment 1

Figure 3:
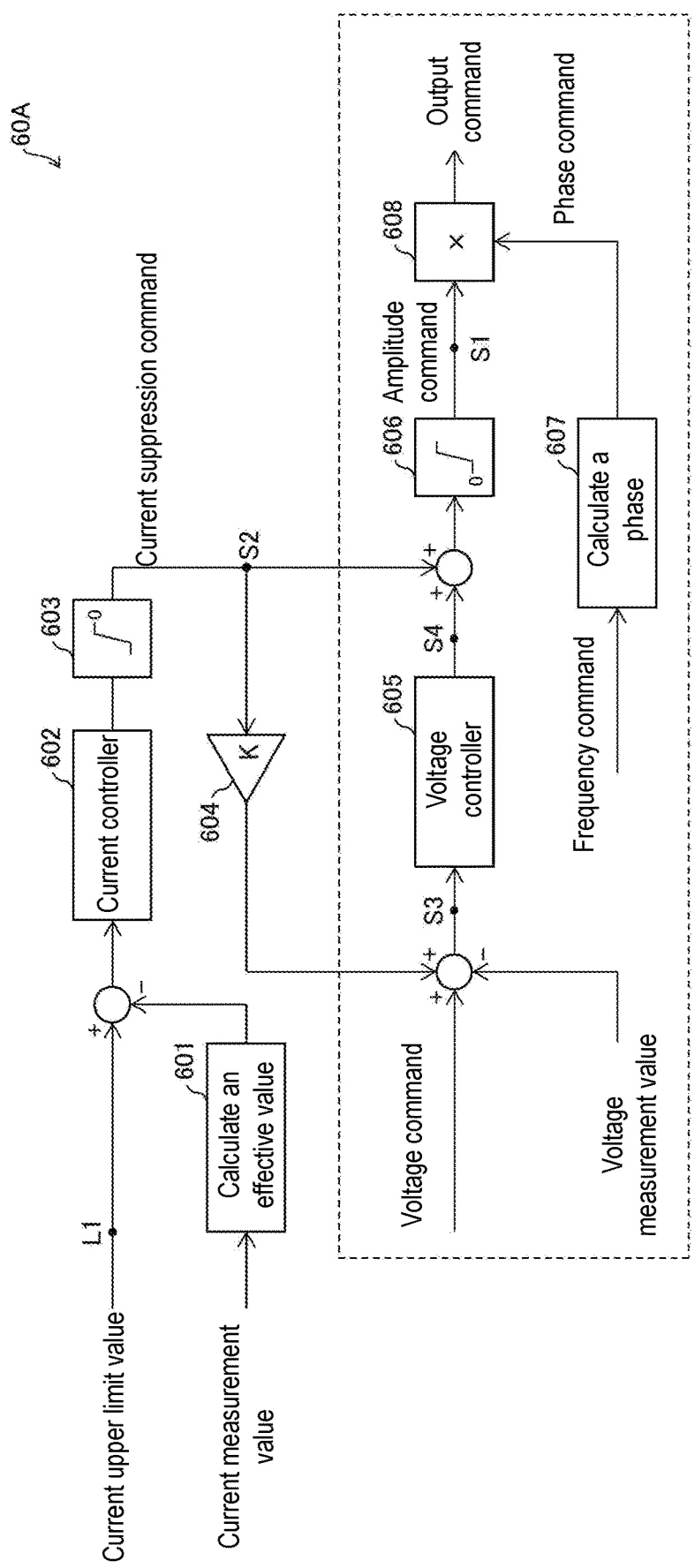
FIG. 3 is a diagram illustrating a control logic of a control unit of a power supply apparatus according to Embodiment 1 of the invention.
Figure 4:
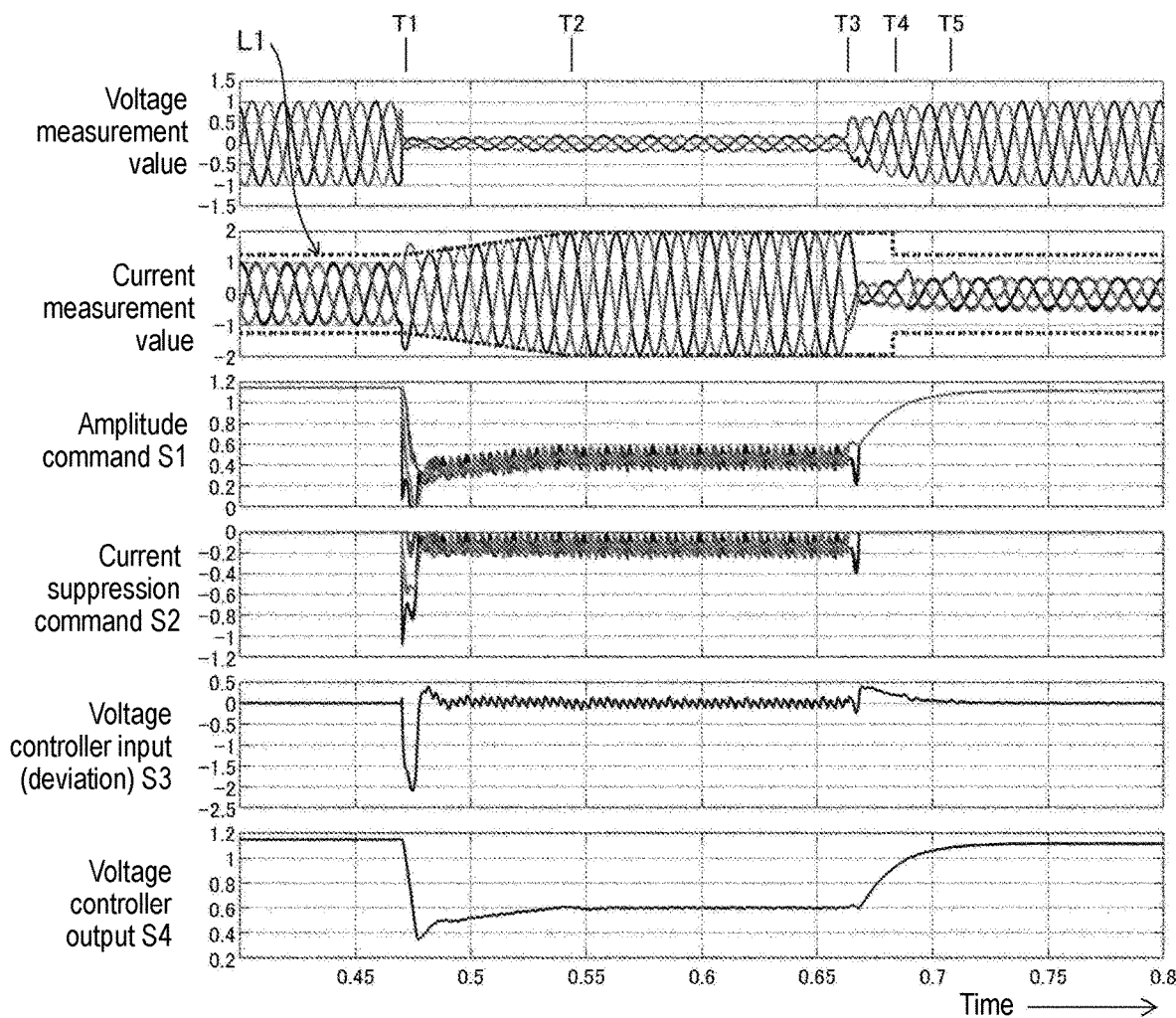
FIG. 4 is a time chart illustrating signal waveforms of respective units of the power supply apparatus according to Embodiment 1 of the invention.

In the following, Embodiment 1 as a specific example using the power supply apparatus 1 and the operation thereof will be described. FIG. 3 is a diagram illustrating a control logic of a control unit 60A of the power supply apparatus 1 in Embodiment 1. FIG. 4 is a time chart illustrating the voltage measurement value (output voltage of the power supply apparatus 1), the current measurement value (output current of the power supply apparatus 1), and the control signal at each point of the control part 60A in Embodiment 1.

The output command in Embodiment 1 is an instantaneous value of the output voltage instructed to the DC-AC converter 20. An instantaneous value $V\sin(\omega t)$ is a product of a phase component $\sin(\omega t)$ and an amplitude component V. A phase command representing the phase component $\sin(\omega t)$ is calculated by a functional block of phase calculation 607 based on a frequency command (equivalent to $\omega$).

The amplitude component V is calculated as an amplitude command S1. Since the amplitude is non-negative, in the calculation of the amplitude command S1, a limiter 606 limiting a signal less than 0 is provided. The output command is generated by multiplying the amplitude command S1 by the phase command by using a multiplier 608.

The portion shown as being encircled by a broken line in FIG. 3 is equivalent to the output instruction unit 63 in FIG. 2. Usually, the portion excluding the portion shown as being encircled by the broken line has no influence on the output command from the control unit 60. Usually, a difference (deviation S3) between the voltage command (normally the rated voltage) and the voltage measurement value is input to a voltage controller 605.

The voltage controller 605 is a functional block performing normal PI control. The voltage controller 605 calculates a voltage controller output S4 based on the deviation S3 and the integration of the deviation S3 from the past. If the deviation S3 and the integration of the deviation S3 are 0, the voltage controller 605 continues to calculate a constant value as the voltage controller output S4. If the deviation S3 and the integration of the deviation S3 are other than 0, the voltage controller 605 calculates the voltage controller output S4 so that the deviation S3 is toward 0. By doing so, the control unit 60A, at usual times (before a time T1 of FIG. 4), feedback-controls the DC-AC converter 20, so that the voltage measurement value becomes the voltage command (normally the rated voltage).

In order to feed the current measurement value from the current measurer 40a back to the output command in the case where a short circuit failure, for example, occurs in the feeder 90, functional blocks equivalent to the current upper limit setting unit 61 and the target voltage setting unit 62 of FIG. 2 are provided in the control unit 60A of Embodiment 1.

Assuming a normal feedback control system (only the portion shown as being encircled by a broken line in FIG. 3) without these functions, in the case where a short circuit failure, for example, occurs in the feeder 90, the operation is as follows.

When the short circuit failure occurs in one of the feeders 90, the output current (current measurement value) of the power supply device 1 increases drastically, and the output voltage (voltage measurement value) drops. Then, a state where there is a difference between the voltage command and the voltage measurement value (the deviation S3 being positive) occurs, and the voltage controller 605 attempts to increase the amplitude command.

However, there is a limit on the current which the DC-AC converter 20 is able to output, and the output voltage (voltage measurement value) cannot return to the voltage command (normal value). The power supply apparatus 1 comes to a state in which the voltage as in the command of the voltage controller 605 cannot be output. When the short circuit failure continues, since the deviation S3 stays positive, the integration of the deviation S3 in the voltage controller 605 accumulates, and the voltage controller 605 further increase the amplitude command.

In such state, when the breaker 91 trips to disconnect the feeder in which the failure occurs, the supply of the failure current disappears, and it is possible for the DC-AC converter 20 to output a voltage in accordance with the amplitude command S1 from the voltage controller 605. At this time, the amplitude command S1 exceeds the voltage command (normal value), and the output voltage drastically increases.

Then, a transient overcurrent (excitation inrush current) flows in the transformer in the power system 100, and there is a possibility that the DC-AC converter 20, etc., be damaged. At this time, even if the amplitude command is the voltage command (normal value), since the output voltage also increases drastically, there is also a possibility that the DC-AC converter 20, etc., be damaged in such case.

Actually, in the control unit 60A of Embodiment 1, in the case where a short circuit failure occurs in the feeder 90, the operation is as follows.

A current upper limit L1 of FIG. 3 is the same as the one calculated by the current upper limit setting unit 61 of FIG. 2. At the normal time when the current upper limit value L1 is smaller than the first limit value (before the time T1 in FIG. 4), the current upper limit value is the first limit value. When the current measurement value exceeds the first limit value (at the time T1) from the normal state, the current upper limit value L1 is increased to the second limit value. The current upper limit value L1 increases gradually from the first limit value to the second limit value (time T1 to time T2).

When the state in which the current measurement value exceeds the first limit value is resolved (time T3), the current upper limit value L1 returns to the first limit value after (time T4) a predetermined period (time T3 to time T4). The signal waveform of the current upper limit value L1 is shown together with the graph of the current measurement value of FIG. 4.

The difference (deviation) between the current upper limit value L1 and the current measurement value (a value proportional to the effective value of the current waveform calculated by a functional block of effective value calculation 601, in the case where the current measurement value is the instantaneous value) is input to the current controller 602. The current controller 602 is a functional block performing normal PI control. If the deviation and the integration of the deviation are 0, the current controller 602 continues to calculate 0 as the output. If the deviation and the integration of the deviation are other than 0, the voltage controller 605 calculates the output so that the deviation S3 is toward 0.

In the case of being negative through a limiter 603, the output of the current controller 602 is calculated directly as a current suppression command S2. In a case elsewhere, with the functioning of the limiter, the current suppression command S2 is 0, and the current measurement value is not reflected in the voltage command.

The current suppression command S2 is multiplied by a properly set proportional coefficient K by using a gain 604 and added to the voltage command. The current suppression command S2 is further properly added to the voltage controller output S4. A sum (not negative) of the current suppression command S2 and the voltage controller output S4 becomes the amplitude command S1.

At the time T1 of FIG. 4, a short circuit failure occurs in three phase lines in one of the feeders 90. Here, a three-phase balanced failure is assumed. Then, the current measurement value exceeds the current upper limit value (first limit value) and increases drastically. The current controller 602 calculates a negative value to reduce the current. The current suppression command S2 is multiplied by K and added to the voltage command, and the voltage controller input S3 (deviation) becomes a greater negative value. As a result, the voltage controller output S4 drops, and the amplitude command S1 drops below the voltage command (normal value).

As a result of the feedback control, the current measurement value becomes the current upper limit value L1, the amplitude command S1 is balanced and becomes constant when becoming a voltage value smaller than the voltage command, and the voltage controller input S3 (deviation) becomes substantially 0 (after the time T1 to the time T3). Accordingly, even when the short circuit failure continues, the deviation does not accumulate in the voltage controller 605. Even when the short circuit failure continues, as described above, the output voltage of the power supply apparatus 1 is controlled to a value (a value lower than the normal value) instructed by the control unit 60A.

At this time, the deviation, which is the input of the current controller 602, also becomes 0. Specifically, at the time when the current upper limit value L1 becomes the second limit value from the time T2 to the time T3, the DC-AC converter 20 is feedback-controlled so that the current measurement value becomes the second limit value. The power supply apparatus 1 keeps outputting the current of the second limit value, and as a result, the breaker 91 of the feeder in which the failure occurs trips at the time T3, and the feeder in which the failure occurs is disconnected. The abnormal current is removed, and the output current (current measurement value) of the power supply device 1 returns to the normal value below the first limit value. Then, the current suppression command S2 becomes 0, and is not added to the voltage command.

As a result of PI control, the voltage controller 605 gradually restores the voltage controller output S4 to the voltage command (normal value). By doing so, the voltage measurement value gradually returns (time T3 to time T5) to the voltage command (normal value) from the small value at the time when the short circuit failure continues.

Embodiment 2

Figure 5:
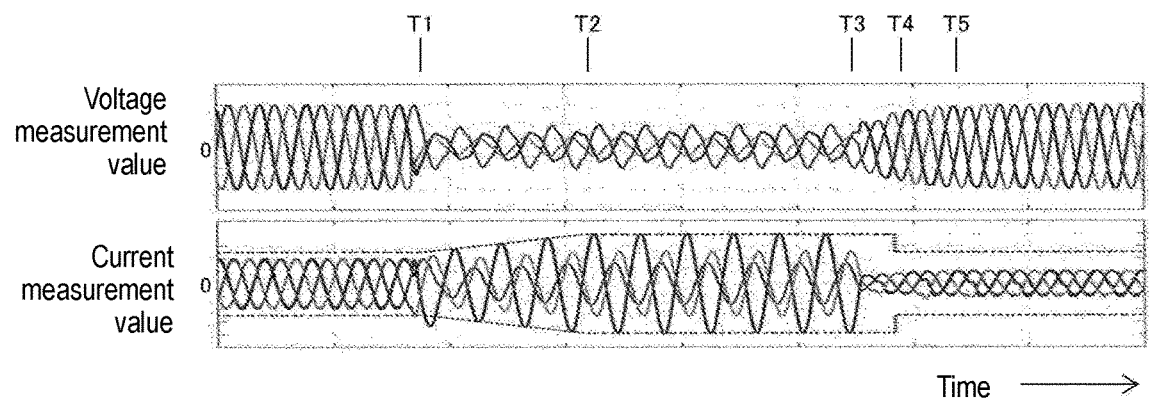
FIG. 5 is a time chart illustrating signal waveforms of respective units of the power supply apparatus according to Embodiment 2 of the invention.

Embodiment 2 shows that the short circuit failure which occurs in one of the feeders 90 is the result of a short circuit failure of two phase lines in a three-phase unbalanced failure. The apparatus configuration of the power supply apparatus 1 is the same as that of Embodiment 1. FIG. 5 illustrates the waveforms of the voltage measurement value and the current measurement value in the case of Embodiment 2. The respective times T1 to T5 shown in FIG. 5 are the same as the case of Embodiment 1.

As shown in the drawings, even if the failure is a short circuit failure of two phase lines, the result is the same as the case of Embodiment 1. Immediately after the short circuit failure occurs at the time T1, the output voltage of the power supply apparatus 1 is narrowed down. From the time T1 to the time T2, the output current (current measurement value) of the phase with the maximum current is controlled to gradually increase from the first limit value to the second limit value.

When the state in which the output current (current measurement value) of the power supply apparatus 1 is at the second limit value continues, the feeder in which the failure occurs is disconnected at the time T3. Then, from the time T3 to the time T5, the output voltage (voltage measurement value) of the power supply apparatus 1 gradually returns to the voltage command (normal value).

<Effects>

The power supply apparatus 1 according to the embodiment includes the energy storage device 10 and the DC-AC converter 20 converting the DC output of the energy storage device 10 into an AC output. Therefore, the power supply apparatus 1 functions as a power supply for smoothing or as a backup of another power generation system supplying power to the power system 100. Accordingly, according to the power supply apparatus 1, it is possible to supply power during the night in the case where the another power generation system is a solar power generation system, for example, or supply power when it is windless in the case where the another power generation system is a wind power generation system. In addition, the power supply apparatus 1 may function as a backup in case that the another power generation system fails.

In the power supply apparatus 1 according to the embodiment, when the power supply apparatus 1 supplies power to the power system 100, stoppage still suppressed at the time when a short circuit failure occurs in one of the feeders 90, the failure current flows out, and the voltage of the power system 100 drops.

In a power generation system using a synchronous generator, there is sufficient capacity for supplying an emergency current greater than a rated current. Therefore, even in the case where a short circuit failure occurs, it is common to not disconnect the synchronous generator from the system to stop operation. However, in the power generation system using a DC-AC converter, the capacity for supplying an emergency current to the DC-AC converter is not as sufficient, and damages may be caused if the overcurrent continues. Therefore, it is common to disconnect from the system to stop the operation in the case where a short circuit failure occurs.

However, in the power supply apparatus 1 according to the embodiment, even in the case where a short circuit failure occurs, the power supply apparatus 1 controls the output voltage in a narrowed state to continue the power supply to the system, so as to supply a current with a current value (second limit value) temporarily greater than the rated current to the system. Then, the power supply apparatus 1 functions to be able to cause the breaker 91 of the feeder in which the failure occurs to trip to disconnect the feeder in which the failure occurs from the system. Therefore, while the power supply apparatus 1 is a power supply using the DC-AC converter 20, the power supply to the power system 100 can continue even at the time of abnormality such as the time when a short circuit failure occurs.

At the time of the return due to the disconnection of the feeder where the failure occurs, the power supply apparatus 1 exerts control, so that the output voltage (voltage measurement value) is restored gradually. Therefore, the situation where a transient overcurrent (polarized inrush current) occurs due to the transformer in the power system 100 in the case where the output voltage (voltage measurement value) increases drastically to damage the DC-AC converter 20 of the power supply apparatus 1 is effectively suppressed.

Accordingly, if the power supply apparatus 1 according to the embodiment is used in the power system 100, the power supply can continue as much as possible regardless of the occurrence of the short circuit failure.

In the embodiment, the return of the current upper limit value by using the current upper limit setting unit 61 from the second limit value to the first limit value is performed by detecting that the current measurement value returns to the first limit value or less. However, the return to the first limit value may also be performed through the current upper limit setting unit 61 receiving a signal indicating the disconnection of the feeder from the breaker 91 which trips.

In the embodiment, it is described that the control of the respective phases is not particularly distinguished based on phases, but is executed through general control. At this time, the control unit may exert control to adopt, as the voltage measurement value and the current measurement value, the minimum value among the phases for the voltage and the maximum value among the phases for the current. Alternatively, a three-phase instantaneous effective value (the root mean square of the instantaneous voltage values of the respective phases) may also be adopted as the current measurement value. However, regarding the control of each phase, the control unit may also perform control individually for each phase. In this case, the current upper limit value may be generally determined and may also be determined for each phase.

In the embodiment, the voltage command and the frequency command are considered as constant values, particularly considered as rated values, and not considered as values that change. This is equivalent to the case where the power system is used under the so-called constant voltage constant frequency. However, in the case where the power supply apparatus 1 cooperates with a power generation system such as a diesel power generator, in which voltage or frequency changes in accordance with the load state, the voltage command and the frequency command may also be adjusted in correspondence with such change.

[Example of Realizing by Software]

The respective functional blocks (particularly the control units 60, 60A) of the power supply apparatus 1 may be realized by logic circuits (hardware) formed by integrated circuits (IC chips), and may also be realized by software.

In the case of the latter, the power supply apparatus 1 includes a computer executing the command of a program which is the software for realizing the respective functions. The computer, for example, includes at least one processor (control apparatus), and includes at least one recording medium storing the program and readable by the computer. In addition, in the computer, the processor reads the program from the recording medium and executes the program, thereby achieving the objective of the invention. As the processor, for example, a central processing unit (CPU) can be used.

As the recording medium, in addition to a non-transient tangible medium, such as a read only memory (ROM) and others, a tape, a disc, a card, a semiconductor memory, a programmable logic circuit, etc., can also be used. In addition, the computer may further include a random access memory (RAM) for expanding the program. In addition, the program may also be supplied to the computer via an arbitrary transmission medium (communication network, broadcast wave, etc.) capable of transmitting the program. In addition, an aspect of the invention may also be realized in the form of data signals embedded in carrier waves, in which the program is embodied, through electronic transmission.

SUMMARY

A power supply apparatus according to Aspect 1 of the invention includes: an energy storage device; and a converter for converting a DC output of the energy storage device into an AC output; a current measurer, measuring a current of the AC output; a voltage measurer, measuring a voltage of the AC output; and a control unit, controlling the converter. The power supply apparatus includes a configuration in which the control unit performs control on the converter, such that, at a time when a value of the current exceeds a first limit value, the value of the current becomes a predetermined value greater than the first limit value by lowering the voltage to be less than a normal value.

According to the above configuration, a power supply apparatus including an energy storage device and capable of keeping supplying power as much as possible even in a case where a short circuit failure, etc., occurs in the power system can be realized.

The power supply apparatus according to Aspect 2 of the invention may be configured as follows: according to Aspect 1 above, the control unit performs the control, at the time when the value of the current exceeds the first limit value, so that the value of the current gradually transitions from the first limit value to the second limit value.

According to the above configuration, in the case where a short circuit failure, etc., occurs, the state of current control which controls and outputs the current value at a desired value can be maintained, and, at the time of a short circuit failure, etc., a state in which the AC output is controlled by the power supply apparatus can be maintained.

The power supply apparatus according to Aspect 3 of the invention may be configured as follows: according to Aspect 1 or 2 above, during the control of lowering the voltage to be less than the normal value, in a case where the value of the current drops below the first limit value, the control unit controls the converter so as to restore the voltage to the normal value.

According to the above configuration, a configuration which restores the state of control of the power supply apparatus to a normal state in a case where a feeder in which an failure occurs is disconnected can be specifically realized.

The power supply apparatus according to Aspect 4 of the invention may be configured as follows: according to Aspect 3 above, the control unit restores the voltage to the normal value so that the voltage gradually transitions to the normal value.

According to the above configuration, the occurrence of a transient overcurrent (polarized inrush current) which damages a DC-AC converter of the power supply apparatus and which is caused by a transformer in a power system as the voltage increases drastically can be suppressed.

A power supply apparatus according to Aspect 5 of the invention includes: an energy storage device; and a converter for converting a DC output of the energy storage device into an AC output; a current measurer, measuring a current of the AC output; a voltage measurer, measuring a voltage of the AC output; and a control unit, controlling the converter. The power supply apparatus includes a configuration in which: the control unit is provided with a current upper limit setting unit, a target voltage setting unit, and an output instruction unit. The current upper limit setting unit operates, so as to: at a time when a value of the current exceeds a first limit value, change a current upper limit value from the first limit value to a second limit value greater than the first limit value, and at a time when the value of the current drops below the first limit value, change the current upper limit value from the second limit value to the first limit value. The output instruction unit controls the converter, so that the voltage becomes a target voltage calculated by the target voltage setting unit. The target voltage setting unit, in a case where the value of the current exceeds the first limit value, lowers the target voltage to be less than a normal value, so that the value of the current becomes the current upper limit value.

According to the above configuration, a power supply apparatus including an energy storage device and capable of keeping supplying power as much as possible even in a case where a short circuit failure, etc., occurs in the power system can be realized.

A control method of a power supply apparatus according to Aspect 6 of the invention is a control method of a power supply apparatus including an energy storage device and a converter for converting a DC output of the energy storage device into an AC output. The control method includes a configuration for performing control on the converter, such that, at a time when a value of a current of the AC output exceeds a first limit value, the value of the current becomes a predetermined value greater than the first limit value by lowering a voltage of the AC output to be less than a normal value.

According to the above configuration, a power supply apparatus including an energy storage device and capable of keeping supplying power as much as possible even in a case where a short circuit failure, etc., occurs in the power system can be realized.

The invention is not limited to the above embodiments, examples, and the like, and various modifications can be made within the scope of the claims. The technical scope of the invention also includes embodiments obtained by appropriately combining the technical means disclosed in the embodiments and the like. Furthermore, new technical features can be formed by combining the respective disclosed technical means.

What is claimed is:
1. A power supply apparatus, comprising:
an energy storage device,
a converter for converting a DC output of the energy storage device into an AC output;
a current measurer, measuring a current of the AC output;

a voltage measurer, measuring a voltage of the AC output; and a control unit, controlling the converter, wherein the control unit is provided with a current upper limit setting unit, a target voltage setting unit, and an output instruction unit, the current upper limit setting unit operates, so as to:

at a time when a value of the current exceeds a first limit value, change a current upper limit value from the first limit value to a second limit value greater than the first limit value, and at a time when the value of the current drops below the first limit value, change the current upper limit value from the second limit value to the first limit value, wherein the output instruction unit controls the converter, so that the voltage becomes a target voltage calculated by the target voltage setting unit, and wherein the target voltage setting unit, in a case where the value of the current exceeds the first limit value, lowers the target voltage to be less than a normal value, so that the value of the current becomes the current upper limit value.

2. The power supply apparatus as claimed in claim 1, wherein the control unit performs the control at the time when the value of the current exceeds the first limit value, so that the value of the current gradually transitions from the first limit value to the second limit value.

3. The power supply apparatus as claimed in claim 2, wherein during the control of lowering the voltage to be less than the normal value, in a case where the value of the current drops below the first limit value, the control unit controls the converter so as to restore the voltage to the normal value.

4. The power supply apparatus as claimed in claim 1, wherein during the control of lowering the voltage to be less than the normal value, in a case where the value of the current drops below the first limit value, the control unit controls the converter so as to restore the voltage to the normal value.

5. The power supply apparatus as claimed in claim 4, wherein the control unit restores the voltage to the normal value, so that the voltage gradually transitions to the normal value.

6. A control method for a power supply apparatus, the power supply apparatus comprising:

an energy storage device; and a converter for converting a DC output of the energy storage device into an AC output, and the control method comprising:

measuring a current of the AC output;

measuring a voltage of the AC output;

changing a current upper limit value from a first limit value to a second limit value greater than the first limit value at a time when a value of the current exceeds the first limit value, and changing the current upper limit value from the second limit value to the first limit value at a time when the value of the current drops below the first limit value;

controlling the converter in a manner that the voltage becomes a target voltage; and in a case where the value of the current exceeds the first limit value, lowering the target voltage to be less than a normal value, so that the value of the current becomes the current upper limit value.

* * * * *